United States Patent
> Paciorek et al.

[15] 3,685,734
[45] Aug. 22, 1972

[54] CONTROLLED FRAGRANCE RELEASE DEVICE

[72] Inventors: Walter J. Paciorek, Woodbury; Randolph Norton, Lake Elmo, both of Minn.

[73] Assignee: Minnesota Mining and Manufacturing Company, St. Paul, Minn.

[22] Filed: Feb. 19, 1971

[21] Appl. No.: 116,951

[52] U.S. Cl..................239/56, 71/DIG. 1, 161/165, 161/231, 161/254, 161/256, 206/0.5, 239/54, 156/281, 156/333, 424/21, 424/22
[51] Int. Cl........A61l 9/04, B32b 27/08, B32b 27/18
[58] Field of Search..........239/34, 53, 54, 55, 56, 57, 239/60; 206/0.5, 59 E, 59 F; 71/DIG. 1; 424/21, 22; 161/165, 231, 252, 254, 256, 406; 156/281, 333

[56] References Cited

UNITED STATES PATENTS

| | | | |
|---|---|---|---|
| 2,169,055 | 8/1939 | Overshiner | 106/180 |
| 3,318,769 | 5/1967 | Folckemer et al. | 424/81 |
| 3,575,345 | 4/1971 | Buck | 239/56 |
| 2,717,174 | 9/1955 | Casanovas | 239/56 |
| 2,615,754 | 10/1952 | Lindenberg | 239/56 |
| 3,310,235 | 3/1967 | Zbinden | 239/55 |
| 3,185,394 | 5/1965 | Farrell | 239/53 |
| 3,608,062 | 9/1971 | Alfes et al. | 239/60 |
| 3,567,119 | 3/1971 | Wilbert | 239/60 |
| 3,037,879 | 6/1962 | Newman et al. | 117/36.1 |
| 2,893,908 | 7/1959 | Antlfinger | 161/254 |

Primary Examiner—Robert F. Burnett
Assistant Examiner—George W. Moxon, II
Attorney—Kinney, Alexander, Sell, Steldt & Delahunt

[57] ABSTRACT

A smooth-surfaced layer of soft vinyl plastisol containing a fragrance or other volatile organic substance is coated on a base and protectively covered with a smooth flexible sheet having low vapor transmission. The assembly is ordinarily substantially odor-free, but when the cover sheet is removed, the fragrance is immediately detectable and is gradually released. Replacing the cover sheet, which displays almost molecular adhesion for the smooth exposed surfaces of the plastisol, immediately stops the release of the fragrance.

12 Claims, 2 Drawing Figures

PATENTED AUG 22 1972  3,685,734

INVENTORS
WALTER J. PACIOREK
RANDOLPH NORTON
BY Kinney, Alexander,
Sell, Steldt & DeLaHunt
ATTORNEYS

CONTROLLED FRAGRANCE RELEASE DEVICE

BACKGROUND OF THE INVENTION

This invention relates to means for controllably retaining and releasing volatile organic materials and to a method of making such a means.

The concept of gradually releasing a volatile fragrance over an extended period of time has long been known. U.S. Pat. No. 2,169,055, for example, discloses mixing essential oils into cellulose acetate solution, forming films or sheets, and evaporating the solvent; the essential oils then slowly volatilize. French Pat. No. 1,558,480 discloses much the same type of product, employing a thermoplastic resin such as a plasticized polyvinyl chloride and incorporating the essential oil in fine porous silica powder. Neither of these patentees provides a product which is effective with highly volatile materials, and the silica retards the olfactory impact of less volatile substances. Then, too, most fragrances are made up of a blend of components, ranging from those having low volatility to extremely volatile "top notes." As the fragrance-containing polymers are exposed to the atmosphere over long periods of time, the top notes tend to evaporate first, causing the aroma of the fragrance to change. The same effect can be observed by placing perfume in a shallow pan and noting its changing aroma from time to time.

U.S. Pat. No. 3,055,297 describes a microporous product containing inks, medicaments and various other liquids in the pores; this product tends to "weep" when subjected to pressure and is not suitable for manufacture in thin layers. U.S. Pat. No. 3,318,769 also describes a relatively thick structure formed of vinyl plastisol and containing a low-volatility pesticide, the manufacturing method precluding the use of extremely volatile materials or the preparation of thin layers.

The only practical way to prevent undesired release of the volatile component in each of the prior art structures described above is to place the object in a sealed container; release then continues only until the air in the container is saturated with the volatile component. There are, however, obvious drawbacks to this method of controlling release, particularly expense and inconvenience.

U.S. Pat. No. 3,494,505 discloses a fragrance sampling means in which fragrance-containing microcapsules are coated on the back of a strip of tape, rupture of the capsules releasing the fragrance. Although the fragrance is successfully retained in the capsules for a long period of time, some skill is required to rupture the capsules, and substantially all the fragrance is immediately released when the capsules are ruptured.

SUMMARY

The invention provides a simple and convenient way of retaining even extremely volatile organic substances for long periods of time, releasing them promptly when desired, terminating the release easily, and repeating the cycle many times. The product is simple, compact, and inexpensive, lending itself to incorporation in magazine advertising. A wide variety of volatile substances can be utilized, e.g., volatile fungicides, herbicides, insecticides, algicides, fertilizers, medicaments, topical anaesthetics, rubefacients, perfumes, vapor phase corrosion inhibitors, food fragrances, animal repellents or attractants, etc. Complex and extremely volatile fragrances may be utilized and released at such a rate that the volatilized fragrance remains substantially constant in composition. Compositions which are susceptible to oxidation or decomposition when exposed to the atmosphere are protected at such times as their detectable presence is not desired, and there is no necessity for including preservatives, which often have a competing and distracting odor of their own.

In its simplest form, the invention is a composite laminar sheet structure comprising (1) a base ply having a low vapor transmission rate, (2) a comparatively thin layer of a plasticized vinyl resin containing the selected volatile organic material and (3) a flexible, continuous, extremely smooth, removable, replaceable cover sheet ply having a low vapor transmission rate. The vapor transmission rate of the base ply and cover sheet ply is conveniently determined with ethyl acetate at 40° C., the rate being less than 0.5 gram per 100 square inches per 24 hours.

The vinyl plastisol resin layer is comparatively soft and has an almost mirror-smooth surface, permitting it to wet and display almost molecular adhesion to smooth surfaces such as the cover sheet ply, which can be peeled away and replaced when desired. The resin layer is on the order of 1–50 mils thick, visually homogeneous, and formed of 20–80 parts by weight of plastisol grade vinyl chloride homopolymer or vinyl chloride:vinyl acetate copolymer, 80–20 parts of plasticizer and an effective amount of the volatile organic substance. This substance, which should not exceed 35 percent by weight of the blend if it is not itself a plasticizer for the vinyl resin, must be compatible with and not reactive with the plasticizer. If more than 35 percent by weight of a nonplasticizing fragrance is included, the surface of the fused plastisol layer tends to feel greasy and the consistency tends to become "cheesy;" further, the fused layer may become opaque, limiting its usefulness. None of the components of the plastisol resin layer should attack either the base or the cover sheet ply.

Plasticizers for vinyl chloride resins are well known, including esters of abietic, adipic, azelaic, benzoic, citric, fumaric, isophthalic, lauric, oleic, pelargonic, phosphoric, phthalic, ricinoleic, sebacic, stearic and sulfonic acids, as well as derivatives of chlorinated biphenyls, epoxys, glycol esters, mellitates, chlorinated paraffins, phenoxys, polyesters and styrenes. As indicated above, certain volatile materials are themselves plasticizers. For use in the present invention, effective plasticizers are those which dissolve or are miscible with the volatile component and which when blended with the other components of the system, have a boiling point above the fusion temperature of the vinyl polymer. When the volatile component is a fragrance, there is the further requirement that the plasticizer have a low background odor.

A convenient way of making a structure in accordance with the invention comprises mixing the vinyl resin, plasticizer and volatile organic substance to form a smooth dispersion, introducing the dispersion between two smooth sheets which have low vapor permeability but which differ in their affinity for the dispersion, subjecting the exposed faces of the sheet to pressure to reduce the thickness of the sandwiched blend to the desired figure, and heating the resultant laminate to fuse the dispersion. Since the fused product should be substantially free from large bubbles, foam, macroporosity or anything which would cause the surface contacting the smooth sheet to be noticeably irregular, components which boil at or below the fusion temperature should be avoided.

Especially in those forms of the invention where fragrance is critical, any components which contribute an aroma other than that intended should be avoided. The addition of such odor-free materials as finely divided silica, however, increases permeability and thus facilitates replacement of fragrance which is volatilized from the surface with fragrance which is deeper in the structure. Interestingly, it appears that as the fragrance escapes, the remainder of the plastisol layer contracts so as to prevent the formation of void spaces. For aesthetic or other reasons, dyes, pigments, etc., may also be included. Similarly, particularly where extraneous odors are not objectionable, it may be desirable to include stabilizers such as dibasic lead phosphite and triphenyl phosphite to neutralize any HCl released from the vinyl resin.

BRIEF DESCRIPTION OF THE DRAWING

Understanding of the invention will be facilitated by reference to the accompanying drawings, in which like numbers refer to like parts in the several views, and in which.

DESCRIPTION OF PRESENTLY PREFERRED EMBODIMENTS

Figure 1:
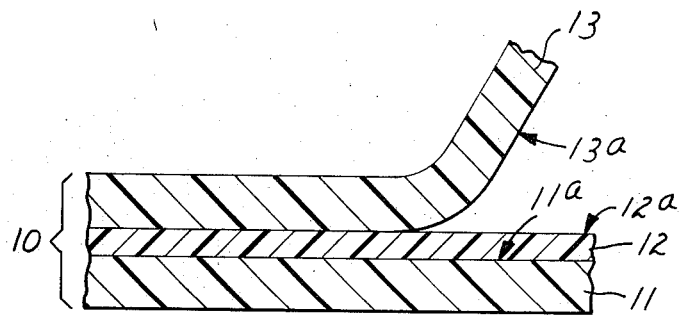
FIG. 1 is a greatly enlarged cross-sectional view of a laminar product made in accordance with the invention, showing the way in which a volatile organic substance is made available for release

In the drawings, composite laminar structure 10 indicates the simplest form of the invention, comprising substrate layer 11, face 11a of which is overcoated with layer 12, comprising a vinyl plastisol resin containing an essential oil or other volatile composition. Layer 12 is flexible and relatively soft, and its upper surface 12a, which is almost mirror smooth, is protectively covered by removable cover ply 13, whose lower surface 13a — also extremely smooth — contacts surface 12a. To make certain that layer 12 adheres to substrate 11 rather than to cover ply 13 when the latter is removed, it is generally preferred either to treat surface 11a so as to enhance its affinity for layer 12, to treat surface 13a so as to decrease its affinity for layer 12, or both.

Figure 2:
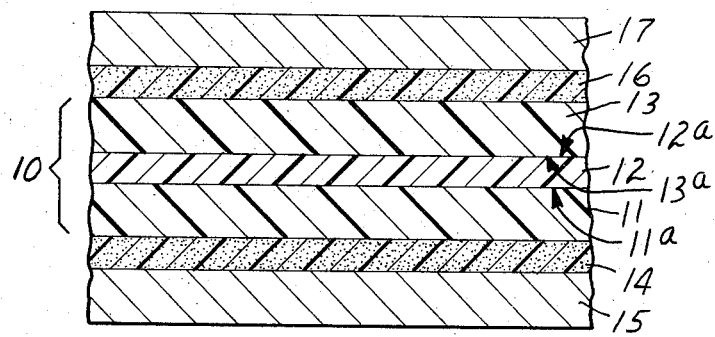
FIG. 2 is a greatly enlarged cross-sectional view of the product illustrated in FIG. 1, showing how it can be utilized in a more complex assembly.

In FIG. 2, product 10 is incorporated into a more elaborate assembly by adhering substrate 11 to stratum 15 with adhesive 14 and by adhering cover ply 13 to stratum 17 with adhesive 16. As an illustration of how this can be accomplished effectively, structure 10 may be sold with adhesive layer 14 and adhesive layer 16 already applied, permitting it to be mounted between adjoining pages 15 and 17 of a magazine, booklet or similar leaved structure. It is frequently preferred to have layer substrate 11 and cover ply 13 all transparent, thus permitting product 10 to be applied over printed matter. Separating page 17 from page 15 exposes surface 12a of layer 12, thereby releasing the volatile substance contained therein. Thus, if the volatile organic material contained in layer 12 is a perfume, structure 10 may be incorporated in an advertisement for the perfume, the combined visual and olfactory impact on the reader providing an extremely persuasive sales device. At the same time, the low vapor permeability of substrate 11 and cover ply 13 prevents the fragrance from escaping to other parts of the magazine, where it might contaminate other similar advertisements.

For other applications it may be desirable to maintain the structure in register when cover ply 13 is replaced by making stratum 15 continuous with stratum 17; in such event strata 15 and 17 constitute a hinge and need not be coextensive with substrate 11 and cover ply 13.

From the foregoing, it is also apparent that structure 10 can be provided with an adhesive only on the exposed lower surface of substrate 11, permitting it to be attached where desired, removing cover ply 13 whenever it is desired to release the volatile component. For example, if the volatile component in layer 12 is a vapor phase corrosion inhibitor, laminar product 10 may be mounted in a fishing tackle box; cover ply 13 is then removed when the box is in storage to expose surface 12a of inhibitor containing layer 12 and thus prevent rusting of the tackle. The adhesive may be heat- or solvent-activated, although normally tacky and pressure-sensitive adhesives are generally preferred.

The examples set forth below, in which all parts are by weight unless otherwise noted, will further indicate, without thereby limiting, ways in which the invention can be practiced.

EXAMPLE 1

Using a high shear mixer, 60 parts of dioctyl phthalate was blended into 100 parts of plastisol grade polyvinyl chloride (commercially available from Union Carbide Corporation under the trade designation QYLF), about 5 minutes being required to obtain a smooth blend at room temperature. An additional 30 parts of dioctyl phthalate was then blended in, after which 19 parts of a perfume (Leather Fragrance No. 5177-S, available from International Flavors and Fragrance) was added and thoroughly mixed throughout the blend. A 4-mil thick layer was then formed between two 1.5-mil biaxially oriented polyethylene terephthalate film sheets, one of the films having its inner face previously coated with a low adhesion coating of the type described in Dixon U.S. Pat. No. 3,318.852. The structure was then heated at 250° F. in a forced air oven for about 2 minutes, until the blend fused, forming a transparent visually homogeneous coating. The completed structure was then stored for one week at room temperature, during which time it displayed substantially no odor. When the two polyester films were then separated, however, the perfume-containing plastisol layer preferentially adhered to the untreated polyester film surface, exposing the surface which had been adjacent the LAB-treated surface of the other polyester film, and immediately releasing fragrance. The removed film could be readily replaced, immediately suspending further fragrance release, and the process repeated scores of times without noticeable loss of effectiveness or change in fragrance. This fact is considered particularly important because of the nature of the perfume, which is made up of several components having quite different degrees of volatility. The structure of this example appears to permit release of the various components, which include a spectrum ranging from low volatility oils to highly volatile "top notes," in the same ratio as they appear in the perfume.

The biaxially oriented polyester film used as both the substrate layer and the cover sheet layer in this example are tested for vapor permeability in a modified version of the well known moisture vapor permeability test described in Paint Manufacturers Association of the United States, Bulletin 19, 24—S (1901). In the test 50 cc of ethyl acetate (which is an ester and hence similar to many fragrances) is poured into a glass jar. An annular lid, having a center opening of known area, is then used to hold the film snugly against the top of the jar, the edges of the lid being sealed to the jar with aluminum foil tape. The weight of the unit is then recorded and measured at 24 hour intervals, until constant rate of loss is obtained at 40° C. and 50 percent relative humidity. The permeability as measured in grams of ethyl acetate transmitted per 100 in$^2$ per 24 hours is then calculated. For a 1-mil polyester film, this value is found to be about 0.08 gram, and the transmission rate for any material to be employed as either substrate or cover ply should not exceed 0.5 gram per 100 sq. in. per 24 hours. If this value is substantially exceeded, the ability of the substrate or cover ply to prevent inadvertent loss of volatile material is drastically reduced. Materials which can be substituted for the polyester film include other low vapor permeability sheet materials, e.g., aluminum foil-surfaced paper sheets (the foil contacting the plastisol layer), particularly in applications where transparency is not important.

A similar and equally effective test for measuring vapor transmission rate is ASTM No. E96–53T.

EXAMPLE 2

The cover sheet ply is removed from the product of Example 1, after which the fragrance-containing plastisol-coated substrate is wound, film side out, convolutely about itself to form a roll. The ability of the plastisol surface to cling to a smooth surface insures that the roll will remain wound but permits unwinding when it is desired to remove a strip of the material. The same type of product can be formed without use of a cover sheet by forcing the exposed surface of the plastisol against a steel web, fusing the plastisol, continuously separating the resultant product from the web, and winding it convolutely about a core in the manner just described. Alternatively, the substrate may be wound into a convolute roll after coating with the plastisol and the plastisol then fused; this technique, however, requires that the viscosity of the plastisol be kept sufficiently high to prevent its being squeezed out of the roll before fusion. If a blend of citrus oil and pine oil is substituted for the perfume, one obtains a convenient means for providing and dispensing strips of air freshener from a roll mounted in a conventional tape dispenser.

EXAMPLE 3

A 95:5 vinyl chloride:vinyl acetate copolymer, plastisol grade (commercially available from Union Carbide Corporation under the trade designation VLFV) is substituted for the vinyl chloride plastisol resin of Example 1. Fusion of the coating could be effected at 225° F., a fact which lends itself to the incorporation of even more volatile or oxidation-sensitive components, e.g., Mint Tea 570244 sold by Polack's Frutal Works and Creme de Menthe 10894–D sold by Fritzsche, Dodge & Olcott. "Tenneco" 0565, a 96:4 vinyl chloride:vinyl acetate copolymer, may be substituted for the VLFV.

EXAMPLE 4

Example 1 is repeated, replacing the 19 parts of perfume with 1 part of Pizza 54214, commercially available from Fritzsche, Dodge & Olcott and forming a 0.25 mil layer. The extreme volatility and high olfactory impact of this material makes it effective at even this low concentration.

EXAMPLE 5

Using the general blending and forming procedures specified in the preceding examples, the following components were blended.

|  | Parts by weight |
| --- | --- |
| QYLF vinyl resin | 100 |
| Dioctyl phthalate | 90 |
| Menthol | 105 |
| Fumed silica, 0.012 micron | 7.5 |

The fumed silica, commercially available from Godfrey L. Cabot Co. as "Cab-O-Sil" M–5, served to increase viscosity and minimize running and sagging of the coating prior to fusion. Upon removal of the cover sheet ply from this product, the exposed surface of the menthol-containing plastisol layer could be placed in contact with the skin to provide a rubefacient effect. Methyl salicylate, camphor and other materials may be used instead of or in combination with the menthol to prepare external analgesic, topical decongestant and counter-irritant formulations. If a slowly volatile topical anaesthetic, such as lidocaine or benzocaine is substituted for the menthol, local relief of itching, burns, etc., may be obtained; the site of an injection or blood withdrawal can likewise be pre-insensitized. Likewise cantharadin or salicylic acid may be included to provide a product having utility in the topical treatment of warts, corns, etc.

EXAMPLE 6

Forty-two parts of dicyclohexylamine stearate was dissolved in 160 parts dioctyl phthalate and blended with 50 parts "QYLF" polyvinyl chloride and 4 parts of fumed silica. The blend was formed between polyester films and fused as in claim 1. Upon removal of the cover sheet, this material could be placed or preferably adhered or otherwise mounted, in tool boxes, etc. In such environments it functioned effectively to prevent tarnish, rust and corrosion for long periods of time, the high plasticizer:resin ratio affording quite slow release of the dicyclohexylamine stearate.

EXAMPLE 7

Example 6 is repeated, replacing the dicyclohexylamine stearate with a disinfectant compound such as pine oil or alkyl dimethyl-ethylbenzylammonium cyclohexylsulfonate, yielding an assembly which, after removal of the cover sheet, can be placed in a water environment (e.g., in a toilet flush tank, wash bottle, mop head, etc.) to provide long term release. Since the vinyl does not absorb an appreciable amount of water, the active material is not leached, but is washed from the surface after diffusion through the plastisol. Other suitable materials, such as algicides, can be used for treatment of aquariums, swimming pools, etc.

EXAMPLE 8

Using the general procedures specified in the preceding examples, the following components were blended and formed:

| | |
|---|---|
| QYLF vinyl resin | 100 |
| Dioctyl phthalate | 25 |
| Hexadecyl mercaptan | 15 |

Upon removal of the cover sheet, the product could be installed to protect furniture, shrubs, etc., from damage by dogs, cats, rabbits, skunks and other animals, hexadecyl mercaptan being a known animal repellent. Conversely, a fragrance which is neutral to a pet, e.g., oil of lemon grass, can be substituted for a repellent; small strips can then be affixed in a specific location to assist in training the pet by association. The low plasticizer:resin ratio tends to make the product more brittle than those of previous examples.

EXAMPLE 9

Example 1 was repeated, substituting cod liver oil for the perfume, incorporating about 6 parts of fumed silica in the blend, and coating the plastisol layer approximately 50 mils thick. The resultant product can be cut into strips resembling pork rind and used as bait on fishing tackle to enhance the appeal thereof to various fish.

EXAMPLE 10

Equal parts by weight of QYLF vinyl resin and Universal Oil Product's Strawberry Fragrance No. 36 (a blend of aliphatic and aromatic esters) were blended and formed as in Example 1. Since this fragrance is itself a plasticizer for the vinyl resin, there was no need for a separate plasticizer.

EXAMPLE 11

Thirty parts of 8-hydroxyquinotine and 150 parts of diethyl phthalate were heated together to form a solution, cooled to room temperature, and blended with 100 parts of QYLF polyvinyl chloride resin and 10 parts of fumed silica to form a smooth dispersion. A 2-mil layer is then formed between two differentially treated 1.5-mil polyester films as in Example 1 and the structure heated at 250° F. for 3 minutes to fuse the dispersion.

This product can be used as an activator sheet in copying a page from a book as follows: The less well-adhered polyester film is removed and the plastisol layer placed in contact with the page to be copied. The book is then closed, to provide uniform contact for a period of about 15 seconds to 2 minutes, during which time 8-hydroxyquinoline volatilizes and is absorbed by the ink on the printed page. The activator sheet is removed from the book, the polyester protective film replaced to preserve the activator sheet for future use, and a copy sheet inserted in the book for a period of about 30 seconds to 5 minutes. Suitable copy sheets and their methods of use include the following:

a. Filter paper which has been dipped in a 5 percent solution of 2,5-dimethoxy-1-morpholino-benzenediazonium fluoborate and dried. A latent image is formed and developed by exposure to ammonia vapors. If 60 parts of dicyclohexyl amine is included in the activator sheet formulation, an image is formed directly, i.e., without any ammonia development.

b. Filter paper saturated with ferric chloride forms an image while in contact with the print.

c. Filter paper saturated with a silver soap, e.g., silver behenate, forms a latent image which is developed by heating on a hot plate.

Many variations can be made in the products and manufacturing steps described without departing from the spirit of the invention. To illustrate, a fragrance-containing plastisol may be formed in narrow spaced strips between two wide polyester sheets, making it convenient to slit between the strips and thus provide a tab for exposing the surface. For the same purpose, the plastisol may be formed as a series of spaced spots and the base and cover plies died out in an area surrounding but larger than each spot.

Insect traps may also advantageously incorporate products of the invention. A prebaited trap may be sold in collapsed form and expanded in the field to simultaneously remove the cover sheet ply from a coated plastisol layer containing a volatile insect sex attractant and expose a tacky insect-holding adhesive. Likewise, plastisol coatings may incorporate potent insect repellents which are highly volatile and have low persistence on skin.

What is claimed is:

1. A composite laminar sheet structure comprising in combination:
   1. a supporting base ply having an ethyl acetate vapor transmission rate of less than 0.5 gram per 100 square inches per 24 hours at 40° C.,
   2. a visually homogeneous layer bonded to one face of said base, said layer having
      a. a composition consisting essentially of a blend of
         i. 20 to 80 parts by weight of plastisol grade vinyl resin selected from the class consisting of vinyl chloride homopolymer and vinyl chloride:vinyl acetate copolymer,
         ii. 80 to 20 parts by weight of plasticizer for said vinyl resin, said plasticizer boiling at a temperature above the fusion temperature of said vinyl resin, and
         iii. an effective amount of volatile organic substance, said substance being compatible with and not reactive with said plasticizer,
      b. a thickness of about ¼ to 50 mils,
      c. the surface distal to said base characterized by smoothness and ability to wet and adhere to smooth surfaces, and d. no tendency to attack either said base or the hereinafter mentioned cover sheet, and 3. a flexible continuous smooth cover sheet ply having an ethyl acetate vapor transmission rate of less than 0.5 gram per 100 square inches per 24 hours at 40° C. and 50 percent relative humidity covering said layer and wetted thereby so as to be lightly adhered thereto but capable of repeated removal and replacement without damaging said layer, whereby said volatile substance is retained by said structure for extended periods of time, becomes immediately available and gradually released when said cover sheet is removed, and is again retained when said cover sheet is replaced.

2. The structure of claim 1 wherein the composition contains a viscosity-increasing agent.

3. The structure of claim 2 wherein the viscosity-increasing agent is fumed silica.

4. The structure of claim 2 wherein the layer-contacting face of the base is primed to enhance its receptivity to vinyl plastisols.

5. The structure of claim 1 wherein the base and the cover sheet are adhered to opposing pages in a leaved folder, booklet, magazine or the like.

6. The structure of claim 1 wherein the base is a biaxially oriented polyethylene terephthalate film.

7. The structure of claim 1 wherein the layer-contacting surface of the cover sheet is provided with a release agent to decrease its receptivity to vinyl plastisols.

8. The structure of claim 1 wherein the base and the cover sheet are both flexible biaxially oriented polyethylene terephthalate films, the layer-contacting surface of the base sheet being treated to increase its receptivity to vinyl plastisols and the layer-contacting surface of the cover sheet being treated to decrease its receptivity to vinyl plastisols.

9. The structure of claim 8 wherein the base sheet and the cover sheet are the same film, said product being wound convolutely upon itself in roll form to expose said film.

10. The structure of claim 8 wherein at least one exposed surface of said polyethylene terephthalate film is provided with an adhesive.

11. The structure of claim 10 wherein the volatile substance is a fragrance.

12. A method of making a structure in accordance with claim 1 comprising the steps of 1. blending powdered plastisol grade vinyl resin, approximately an equal weight of plasticizer, and an amount of a volatile fragrant oil equal to at least about 5 percent the combined total weight of the previously mentioned components to form a dispersion, 2. introducing said dispersion between two smooth sheets, each of which has a low ethyl acetate vapor transmission rate, the dispersion-contacting surface of the two sheets differing in their affinity for said dispersion, 3. subjecting the exposed faces of said sheets to pressure to reduce the dispersion to a layer having a thickness no greater than about 25 mils, and 4. heating the resultant structure to a temperature and for a time sufficient to fuse said dispersion.

* * * * *